United States Patent [19]
Bhatia et al.

[11] Patent Number: 5,932,276
[45] Date of Patent: Aug. 3, 1999

[54] LOW WATER ACTIVITY EGG PRODUCT

[75] Inventors: Usha B. Bhatia, Roseville; John R. Graves, Shakopee, both of Minn.

[73] Assignee: The Pillsbury Company, Minneapolis, Minn.

[21] Appl. No.: 08/770,489

[22] Filed: Dec. 20, 1996

Related U.S. Application Data

[63] Continuation of application No. 08/475,860, Jun. 7, 1995, abandoned.

[51] Int. Cl.$^6$ ..................................................... A23L 1/32
[52] U.S. Cl. .......................... 426/614; 426/94; 426/330.1; 426/558; 426/613
[58] Field of Search ..................................... 426/613, 614, 426/330.1, 558, 368, 94

[56] References Cited

U.S. PATENT DOCUMENTS

| | | |
|---|---|---|
| 1,686,556 | 10/1928 | Griswold . |
| 2,142,510 | 1/1939 | Harris et al. . |
| 2,176,080 | 10/1939 | Katzman . |
| 2,395,587 | 4/1946 | Scott et al. ............................... 426/614 |
| 2,901,360 | 8/1959 | Gorman et al. .......................... 426/614 |
| 3,293,044 | 12/1966 | Torr ......................................... 426/614 |
| 3,640,731 | 2/1972 | Kaplow et al. . |
| 3,769,404 | 10/1973 | Latham et al. ........................... 426/614 |
| 4,046,922 | 9/1977 | Burkwall, Jr. . |
| 4,072,764 | 2/1978 | Chess . |
| 4,120,986 | 10/1978 | Lynn ....................................... 426/549 |
| 4,244,976 | 1/1981 | Kahn et al. . |
| 4,313,967 | 2/1982 | Kahn et al. . |
| 4,425,369 | 1/1984 | Sakamoto et al. . |
| 4,469,708 | 9/1984 | Rapp et al. . |
| 4,537,788 | 8/1985 | Proctor et al. . |
| 4,748,041 | 5/1988 | Player et al. . |
| 4,762,725 | 8/1988 | Player et al. . |
| 4,963,376 | 10/1990 | Mafisi-Movaghar .................... 426/243 |
| 5,028,448 | 7/1991 | Ros . |
| 5,352,474 | 10/1994 | Lammers . |

FOREIGN PATENT DOCUMENTS

| | | |
|---|---|---|
| 149517 A1 | 7/1985 | European Pat. Off. . |
| 327701 | 4/1980 | United Kingdom . |
| WO 93/07796 | 4/1993 | WIPO . |
| WO 95/04468 | 2/1995 | WIPO . |

OTHER PUBLICATIONS

Howling, David, "Glucose Syrup: Production, Properties, and Applications", Ch. 9 from Starch Hydrolysis Products—Worldwide Technology, Production, and Applications, F. W. Schenck et al., Eds.; VCH Publishers, Inc.,© 1992.

George J. Mountney, Poultry Products Technology, p. 326, 1976.

Basic Microwaving, pp. 92–93, 1978.

Bombauer et al., Joy of Cooking, p. 223, 1975.

*Primary Examiner*—Lien Tran
*Attorney, Agent, or Firm*—Merchant, Gould, Smith, Edell, Welter & Schmidt, P.A.

[57] ABSTRACT

An egg product having a reduced amount of free water comprising at least 30 wt-% whole egg; glycerol; maltodextrin; egg white powder; powdered shortening; liquid egg yolk, and salt. This egg product has a $A_w$ of about 0.80 to 0.95. Food products comprising this egg product, including baked goods and other products having the egg product as a filling or topping, that may be frozen and reheated without the egg product developing a tough or rubbery texture.

24 Claims, No Drawings

LOW WATER ACTIVITY EGG PRODUCT

This is a Continuation of application Ser. No. 08/475,860, filed Jun. 7, 1995 now abandoned.

FIELD OF THE INVENTION

This invention is generally directed to an egg product having a high proportion of real egg. This egg product has a reduced free water content as compared to the free water content of natural whole eggs, and does not become tough or rubbery when frozen and reheated.

BACKGROUND OF THE INVENTION

Eggs are a popular and nutritious food product. Their appealing flavor and texture have caused them to be prepared and consumed in numerous ways, particularly as a breakfast food. Traditionally, eggs have been prepared as a separate dish, or as part of a dish such as omelets, quiches, sandwiches, and recently in breakfast burritos.

As time becomes more and more valuable to the consumers of food products, and the demand for nutritious, quick and easy to prepare foods has grown, producers have sought to provide prepared food products that contain eggs. Because of the difficulty in storing and preserving fresh eggs, these products have often been stored in the freezer, to prevent the growth of undesirable microorganisms in the egg product.

Although freezer storage can be an effective method of storing egg products without growth of microorganisms, the method has given rise to other challenges in the production of egg-containing food products. Because a whole egg is made up of about 70% water by weight, when a prepared egg product is frozen ice crystals are formed. When these crystals melt the water is not completely reabsorbed into the egg product, and some of the water "weeps" out of the eggs. If the eggs are prepared separately, this results in the thawed eggs sitting in a puddle of water and may also result in the eggs having a rubbery texture. If the eggs are prepared as part of the filling of a food that has a crust or pastry component, this results in the transfer of water to the crust or pastry and a soggy texture. Further, the high levels of free water in most egg containing products result in relatively slow reheating times when the product is exposed to radiant heat, such as in a toaster. This is especially problematic when the egg product is used as part of a filling.

In the past, this problem had been addressed by the use of powdered eggs that are reconstituted when combined with additional ingredients. This system allowed the free water in the egg product to be easily controlled, but still resulted in the product having undesirable textural characteristics. The reconstituted egg product has a tendency to become tough or rubbery when it is frozen for storage and then thawed for consumption. This tough texture is believed to be caused by a loss of water when the egg protein is denatured in the dehydration process.

The prior art has attempted to overcome these problems in a number of different ways. Rapp et al., in U.S. Pat. No. 4,469,708, describe a freeze-thaw stable egg product and a process for preparing the product. The product comprises loosely cohered pieces of cooked egg in a batter coating. The egg mixture contains water binding carbohydrates such as a cold-water-insoluble starch and a hydrophilic colloid. The moisture content of the egg mixture is about 72 to about 80%.

In U.S. Pat. No. 3,640,731, Kaplow et al. disclose a shelf stable egg product wherein dried egg white, whole egg solids or egg yolks are blended with 20–40 wt-% of a polyhydric alcohol. This mixture is then combined with starch hydrolyzate solids and an antimycotic to form a shelf stable egg product having a moisture range of 14–32% and an $A_w$ of between 0.65 and 0.80.

Kahn et al., U.S. Pat. No. 4,244,976 disclose an intermediate moisture content frozen egg yolk composition containing egg yolk, sugar, water and a stabilizer. In order to maintain the bacteriostatic effect of the mixture, the sugar to water ratio is at least about 1:1.

Each of the prior art methods of preparing a freezable egg product have certain undesirable features. For example, if large amounts of glycerol are used, the bittersweet taste of glycerol becomes very pronounced and it becomes necessary to mask the taste of glycerol. If large amounts of sugar are used, unless the product is a dessert product, it is necessary to reduce the flavor impact of the sweetness component, for example, by incorporating a bitterness principle such as quinine and caffeine.

Clearly, a substantial need exists for an egg based product that is suitable for freezing which does not become rubbery or tough during storage and may be quickly reheated.

SUMMARY OF THE INVENTION

In one aspect, the invention provides an egg product having low water activity ($A_w$) and a reduced free water content that does not become tough or rubbery during freezer storage, and can be easily reheated. The egg product comprises at least 30 wt-% of an egg source, a humectant system and a tenderizer. Unless otherwise specified, all weight percentages are based on the total weight of the product.

In the egg product of the invention, the free water ordinarily present in eggs is bound by the humectant system. The binding substantially reduces the amount of free water available to freeze and form ice crystals. The tenderizing component of the egg product of the invention enhances the organoleptic properties of the product, such as texture, mouthfeel, consistency and so on. The invention therefore also provides an egg product having a reduced amount of free water comprising at least 30 wt-% of an egg source, a humectant system, tenderizer and a flavor enhancing agent.

In the egg product of the invention, the free water ordinarily present in eggs is bound by the humectant system of the product. This substantially reduces the amount of free water available to freeze and form ice crystals. While a natural whole egg is made up of about 70% total water by weight, in the product of the invention about 48% to 52% of that water is bound, leaving about 18% to 22% total free water. This reduced free water content results in less water being available to freeze and form ice crystals when the product is stored in a freezer. These ice crystals must be melted before the water can be heated, resulting in increased heating times. This problem is solved by the product of the invention. Because of the reduced free water content up, less ice crystals form upon freezing the product and as a result, less time is needed to reheat the product to acceptable eating temperatures.

The invention also provides food products containing the egg product of the invention, such as a filled pastry product, either alone as the filling or with other ingredients in an egg sandwich, pita pocket, breakfast burrito, omelet, or quiche that may be conveniently stored in the freezer until needed.

DETAILED DESCRIPTION OF THE INVENTION

The egg product of the invention having reduced amounts of free water comprises an egg source, a humectant system and a tenderizer.

The egg source component provides the egg product with the desirable organoleptic properties of real eggs. Use of a real egg source results in a composition with the appearance, texture, flavor, and mouthfeel of real whole eggs. In particular, the egg product of the invention may be frozen and reheated without the texture becoming rubbery or tough.

The egg source of the invention is preferably natural whole eggs and ingredients that are predominantly made up of natural egg components, such as dried egg yolk, liquid egg yolk, dried egg white, liquid egg white, dried whole egg solids, or combinations thereof. The egg source may contain minor amounts of additives. For example, the dried egg white may contain sodium lauryl sulfate as a whipping aid. Preferably, the liquid components of the egg source are from fresh eggs. The preferred egg source is real whole eggs. A preferred dried egg white is available from the M. G. Walbaum company of Wakefield, Nebr. A preferred dried egg yolk is available from Primegg Limited of Cameron, Wis.

Typically the total egg source comprises at least about 30 wt-% of the egg product to provide the desired qualities. If too little of the egg source is present, the egg product will not have the desired "real egg" taste. For optimal taste and texture, preferably the egg product contains about 30 to 70 wt-% of the egg source, and most preferably about 60 to 65 wt-%. In an especially preferred embodiment, fresh real whole eggs comprise about 40 to 65 wt-% of the composition.

The humectant system of the egg product provides the ability to absorb and retain water under conditions of medium or high relative humidity, thereby reducing the amount of free water available in the product. Generally, the humectant can be comprised of any material that is able to absorb and retain water, or bind water, such as, for example, alcohols, certain saccharides, salts and mixtures thereof. Examples of usable alcohols include monohydric alcohols, diols, and/or polyols. More specifically, glycerol, propylene glycol, sorbitol, manitol, 1,2-propanediol, and/or mixtures thereof are useable in the invention, with glycerol preferred. Examples of usable saccharides include corn syrup solids such as maltodextrin. Sodium chloride, carboxymethylcellulose, potassium polymetaphosphate, propionate, sodium lactate, monosodium glutamate, glycerine, and/or mixtures thereof are also useful as humectants or water binders. Humectant enhancers including starches such as corn starch or gums such as alginate may also be employed. Salts of any of the previously listed humectants or any other type of humectant and/or mixtures thereof are also useful.

The humectant system may comprise more than one of these humectant or water binding ingredients and is present in a proportion that allows a sufficient amount of water to be bound such that the free water content of the product is less than about 30%. Although the amount will necessarily vary with the preuse humectant system employed, this can be accomplished by the use of about 3 to 8 wt-% of a polyhydric alcohol; about 1 to 10 wt-% of a corn syrup solid; and 0.5 to 2.0 wt-% salt. Because the polyhydric alcohols can provide a bittersweet taste that might be considered unpleasant, preferably no more than about 20 wt-% of these components are present in the egg product.

Although sugar is known to be a humectant, it can impart an overly sweet taste to an egg product. To avoid the problem of over-sweetness caused by using sugar as a humectant, a low D.E. corn syrup solid such as maltodextrin is preferred. Preferably the corn syrup solids used in the egg product of the invention have a D.E. of about 1 to 10 or higher, with a D.E. of about 1 preferred. Maltodextrin is preferred as it functions effectively as a humectant but because of its low D.E. does not provide an overly sweet taste.

The corn syrup solids make up about 1 to 10 wt-% of the egg product, to provide a balance of its water binding properties without imparting too much sweetness. Preferably, about 1 to 5 wt-% maltodextrin or other corn syrup solid, is present to provide the desired balance of these properties. Because the water-binding efficiency of these corn syrup solids increases, as the D.E. increases, proportionately less high D.E. corn syrup solids are used.

Because the water activity, or $A_w$, is related to the amount of free water available in the system, the $A_w$, of the egg product of the invention is also lower than the $A_w$ of natural whole eggs. Water activity is a measure of the water vapor pressure generated by the product and is typically calculated by dividing the moles of water plus the moles of soluble solids into the moles of water. The water activity of the product has an impact on the amount of ice crystals formed upon freezing the product, as discussed above. The water activity of the product also has an impact on the stability of the product against microbiological contamination. If there is less water activity, and therefore less free water in the product, the product will have greater stability against the growth of microorganisms because it is difficult for microorganisms to grow under these conditions. The egg product of the invention, having a lower $A_w$, is thus also less susceptible to spoilage and microbiological contamination than natural whole eggs. The $A_w$ of natural whole eggs is about 0.989, while the egg product of the invention has an $A_w$ of about 0.80 to 0.95, and preferably about 0.84 to 0.91.

Tenderizing components can be added to maintain the water holding capacity of the egg product, to enhance the texture of the egg product and to prevent the product from becoming tough or rubbery after being frozen and reheated. One such tenderizer is shortening, such as vegetable shortening. The shortening is preferably a vegetable shortening in powdered form, although other forms known in the art may be acceptable.

Shortening powders used in the invention contain a major proportion of fat, usually about 75 to 85 wt-%. The fat component of the shortening is typically a hydrogenated vegetable oil, such as hydrogenated soybean oil, vegetable oil, coconut oil, cottonseed oil, sunflower oil, and the like. Vegetable shortenings useful in the preparation of the egg products of the invention may also include other ingredients and additives, such as saccharides, milk proteins or solids, and preservatives.

Another useful tenderizing and texture enhancing ingredient is a powdered cheese blend. Such blends typically comprise dehydrated cheese, such as blue, cheddar, and the like; whey; reduced lactose whey; fat such as partially hydrogenated soybean or vegetable oil; maltodextrin; salt; and various other additives. Such powders not only help maintain the egg-like texture of the product, but provide additional flavoring that is desirable on its own or may help mask any "off" flavors present in the product. Preferably the cheese powder is uncolored, to avoid altering the color of the egg product, and has a relatively mild flavor so the egg flavor is not overpowered. Suitable cheese powders are commercially available from Kraft Food Ingredients of Memphis, Tenn.

The tenderizer, such as the shortening, cheese powder, or a mixture thereof, is generally present in the egg product in amounts ranging from about 10.0 to 40.0 wt-%, in order to maintain good texture. Preferably, about 15 to 35 wt-% of the tenderizing agent is present, and most preferably about 20 to 30 wt-%.

Optionally, flavorings may be included in the egg product, both to provide a variety of desirable flavors and to mask any "off" flavors that may be present in the product. The flavorings may be either natural or artificial. Such flavorings include, but are not limited to, natural egg flavor, salt (which also may comprise part of the humectant system), natural and artificial butter or cheese flavor, pepper, onion, garlic, and so on. If such flavorings are used, they typically comprise about 0.5 to 5.0 wt-% of the egg product, preferably about 1.0 to 3.0 wt-%, although the actual amount will vary with the type of flavoring used.

The composition of the egg product of the invention may be summarized as follows. All amounts shown are by weight percent of the total composition:

| Ingredient | Useful | Preferred | More Preferred |
| --- | --- | --- | --- |
| Egg Source: | 30–70 | 40–65 | 60–65 |
| Whole Egg | 40–70 | 45–65 | 60–65 |
| Egg White Powder | 0–10 | 3–7 | 4–5 |
| Liquid Egg Yolk | 0–30 | 5–25 | 10–20 |
| Humectant System: | 1–30 | 5–25 | 10–20 |
| Glycerol | 1–10 | 2–9 | 3–8 |
| Maltodextrin | 1–10 | 1–5 | 2–4 |
| Salt | 0–5 | 0.5–3 | 1–2 |
| Tenderizer | 10–40 | 15–35 | 20–30 |

The egg product is prepared by first preparing a real egg mixture by combining the liquid egg sources, such as whole egg or liquid egg yolk. Powdered egg sources, such as powdered egg white or egg yolk, are then added and allowed to rehydrate. The remaining dry ingredients are blended and added to the real egg mixture. Mixing continues until the dry ingredients are fully incorporated. The polyhydric alcohol and other liquid ingredients, if any, are then added and blended until well incorporated. Mixing is preferably performed at about 40° F.

When prepared, the egg product will have a consistency approximating that of pancake batter. The pH of the product should be close to neutral or only slightly acidic, from about 5 to 7, to remain at approximately the same pH as natural eggs. Preferably, the product has a pH of about 5.5 to 6.8. The egg product is then ready for inclusion in a prepared food product that can be stored in a frozen state and easily reheated by the consumer.

The egg product may be cooked before its incorporation into the food product, or it may be cooked after combined with the other ingredients of the food product. Whether the egg product is cooked before or after combination with other ingredients, the internal temperature should reach at least 150° F., and preferably about 190° F., to meet applicable safety standards.

The egg product of the present invention is particularly suitable for cooking by microwave energy. Cooking shelled natural eggs using microwave energy provides a transient increase in volume during cooking, but the final egg volume remains unchanged because the natural cooked egg collapses after it is cooked and removed from the microwave cooker. Surprisingly, cooking the egg product of the present invention by microwave energy results in a 60% increase in volume after the egg product is cooked and removed from the microwave cooker. It is believed that the ingredients added to the egg source sustain the increased volume and hold the resulting structure after the egg product has been cooked.

After the egg product is cooked, it can be further processed using conventional methods to provide desired product characteristics such as shape, size and further processability. In one embodiment, the cooked egg product is cooled after cooking, diced and/or shredded, and then frozen in liquid nitrogen using conventional IQF ("individual quick frozen") techniques. An egg product of this embodiment exhibits an appearance similar to a fresh scrambled egg product and is readily integrated with other ingredients of a food product.

The egg product of the invention may be used as a substitute for real eggs in the preparation of any food product that calls for eggs. For example, they may be used as a filling in a pastry product, either alone or with ingredients such as ham, bacon, sausage, cheese, onions, red or green peppers, and combinations thereof. The egg product together with such other ingredients could also be used in an egg sandwich, pita pocket, breakfast burrito, or omelet. The egg product may form part of a complete prepared breakfast, or it may be used in the preparation of quiches or other products that may be conveniently stored in the freezer until needed.

WORKING EXAMPLES

The following examples further describe and illustrate, but do not limit, the invention.

Example 1

Preparation of Low Water Activity Egg Product

| Ingredient | Weight Percent |
| --- | --- |
| Liquid whole egg | 40.40 |
| Glycerol | 5.00 |
| Maltodextrin | 2.00 |
| Salt, sodium chloride | 1.00 |
| Egg white powder with sodium lauryl sulfate whipping agent | 5.00 |
| Powdered shortening | 26.60 |
| Egg yolk, liquid | 20.00 |
| TOTAL | 100.00 |

The whole egg and egg yolk were blended with an egg beater. Egg white powder was added slowly with continuous mixing. After the egg white powder was blended in, the mixture was allowed to sit for five minutes to permit the egg white powder to continue hydrating. During this five minute hydration period, the maltodextrin, salt and powdered shortening were weighed into a container and blended. At the end of the five minute hydration period, with the beater running, the preblended dry ingredients were slowly added to the bowl and were fully incorporated. Finally, the glycerol was added and blended until well incorporated. The resulting mixture was thick, with a consistency similar to that of pancake batter.

Example 2

Low Water Activity Egg Product

| Ingredient | Weight Percent |
| --- | --- |
| Liquid whole egg | 40.00 |
| Glycerol | 5.00 |
| Maltodextrin | 2.00 |
| Salt, sodium chloride | 1.00 |
| Egg white powder with sodium lauryl sulfate whipping agent | 5.00 |

-continued

| Ingredient | Weight Percent |
| --- | --- |
| Powdered shortening | 26.60 |
| Egg yolk, liquid | 20.00 |
| Egg flavoring | 0.40 |
| TOTAL | 100.00 |

The ingredients were mixed in the same manner as in Example 1 with the egg flavor being added with the whole egg.

Example 3

Low Water Activity Egg Product Containing Cheese Powder

| Ingredient | Weight Percent |
| --- | --- |
| Liquid whole egg | 63.00 |
| Glycerol | 5.50 |
| Cheese Powder | 19.85 |
| Salt, sodium chloride | 0.15 |
| Egg white powder with sodium lauryl sulfate whipping agent | 4.00 |
| Powdered shortening | 7.50 |
| TOTAL | 100.00 |

The product was prepared using the procedure of Example 1 with the cheese powder blended with the other dry ingredients before incorporation into the egg mixture.

Example 4

Low Water Activity Egg Product Containing Cheese Powder

| Ingredient | Weight Percent |
| --- | --- |
| Liquid whole egg | 65.00 |
| Glycerol | 5.00 |
| Cheese Powder | 15.00 |
| Egg white powder with sodium lauryl sulfate whipping agent | 5.00 |
| Powdered shortening | 10.00 |
| TOTAL | 100.00 |

The product was prepared using the procedure of Example 3.

Example 5

Low Water Activity Egg Product Containing Cheese Powder and Other Flavorings

| Ingredient | Weight Percent |
| --- | --- |
| Pasteurized Whole Egg | 65.00 |
| Cheese Powder | 15.00 |
| Onion Powder | 0.12 |
| Garlic Powder | 0.02 |
| Potassium chloride | 0.25 |

-continued

| Ingredient | Weight Percent |
| --- | --- |
| Salt | 0.5 |
| Egg white powder | 4.11 |
| Powdered Shortening | 10.00 |
| Glycerol | 5.00 |
| TOTAL | 100.00 |

The product was prepared following the procedure of previous examples with the onion powder, garlic powder and potassium chloride being mixed with the dry ingredients before addition to the egg mixture.

The cheese powder used in the previous examples comprised a dehydrated blend of 20–50% granular and blue cheese containing cheese culture, salt and enzymes; 20–50% whey; 20–50% reduced lactose whey; 5–20% partially hydrogenated soybean oil; 5–20% maltodextrin; 5–20% salt; <5% sodium phosphate; <5% citric acid; and <5% lactic acid.

Example 6

Preparation of a Breakfast Pastry Filled With the Egg Product

A high moisture mixed dough and laminated dough pad may be prepared in the following manner. The ingredients of the dough are:

| Ingredient | Weight Percent |
| --- | --- |
| Hard wheat enriched flour, protein content of 12.5% | 59.78 |
| Water | 34.83 |
| Hydrogenated vegetable shortening (emulsified) | 1.0 |
| Egg yolk solids | 0.85 |
| Active dry yeast | 1.50 |
| Salt, medium fine | 0.50 |
| Coarse dextrose | 1.00 |
| Sodium acid pyrophosphate | 0.25 |
| Powdered bicarbonate of soda | 0.25 |
| Yellow coloring (optional) | 0.04 |
| TOTAL | 100.00 |

The water, optional coloring and hydrated yeast are placed in a mixer. The flour, egg yolk solids and shortening are then added, and the entire combination is mixed until the dough is developed. Thereafter, the dextrose, chemical leavening agents and salt are added, and the final mixture is mixed for two minutes or until the ingredients are fully incorporated into the dough. After the dough is prepared, a dough pad is made by laminating shortening with the dough composition, providing a laminated dough pad having approximately 2 to 6 shortening layers per millimeter of thickness.

The filling of Example 1, comprising approximately 30 wt-% of the total product may be applied and the laminated dough pad is folded down the middle. Then a longitudinal crimper may crimp two sides of the product to give a uniform visual appearance. After cutting into individual portions, the product is proofed, for example, for 25 minutes at 110° F. and 68% relative humidity. Then the product may be moved into a large fryer containing hot fat at a temperature of about 375° F. The product is then cooked by frying. After frying, the product will be ready for freezing, packaging and shipment. The product then may be easily reheated by the consumer, for example, in a toaster.

We claim:

1. An egg product having a reduced amount of free water, consisting essentially of:
   (a) at least about 30 wt-% of an egg source comprising whole egg;
   (b) a humectant system comprising a low dextrose equivalent corn syrup solid in an amount effective to allow a sufficient amount of water to be bound such that the free water content of the product is less than about 30%; and
   (c) a tenderizing component, said tenderizing component selected from the group consisting of a shortening, cheese powder, and mixtures thereof.

2. The egg product of claim 1 wherein the egg source comprises another egg source in addition to the whole egg, said another egg source selected from the group consisting of dried egg yolk, liquid egg yolk, dried egg white, liquid egg white, dried whole egg solids, and a combination thereof.

3. The egg product of claim 1 wherein the egg source comprises about 30 to 70 wt-% of the product.

4. The egg product of claim 1 wherein the egg source comprises a combination of whole egg, liquid egg yolk, and egg white powder and comprises about 30 to 70 wt-% of the product.

5. The egg product of claim 1 wherein the humectant system comprises a mixture of an alcohol, a saccharide and salt.

6. The egg product of claim 1 wherein the humectant system comprises a combination of glycerol, maltodextrin, and salt.

7. The egg product of claim 1 wherein the humectant comprises about 4.5 to 20 wt-% of the product and is a combination of glycerol, maltodextrin, and salt.

8. The egg product of claim 1 wherein the tenderizing component comprises about 10 to 40 wt-% of the product.

9. The egg product of claim 1 having a water activity ($A_w$) of about 0.80 to 0.95.

10. An egg product having a reduced amount of free water consisting essentially of:
    (a) about 30 to 70 wt-% of an egg source comprising whole egg;
    (b) about 4.5 to 20 wt-% of a humectant system comprising a low dextrose equivalent corn syrup solid in an amount effective to allow a sufficient amount of water to be bound such that the free water content of the product is less than about 30%;
    (c) about 10 to 40 wt-% of a tenderizing component, said tenderizing component selected from the group consisting of a shortening, cheese powder, and mixtures thereof; and
    (d) about 0.5 to 5.0 wt-% of a flavor enhancing agent.

11. The egg product of claim 10 wherein the egg source comprises another egg source in addition to the whole egg, said another egg source selected from the group consisting of dried egg yolk, liquid egg yolk, dried egg white, liquid egg white, dried whole egg solids, and a combination thereof.

12. The egg product of claim 10 wherein the egg source is a combination of whole egg, liquid egg yolk, and egg white powder.

13. The egg product of claim 10 wherein the humectant system comprises a mixture of an alcohol, a saccharide, and salt.

14. The egg product of claim 10 wherein the humectant system comprises about 4.5 to 20 wt-% of the product and is a combination of glycerol, maltodextrin, and salt.

15. The egg product of claim 1 having a water activity ($A_w$) of about 0.84 to 0.94.

16. An egg product having a reduced amount of free water comprising:
    (a) about 40 wt-% whole egg;
    (b) about 5 wt-% glycerol;
    (c) about 2 wt-% maltodextrin;
    (d) about 1 wt-% salt;
    (e) about 5 wt-% egg white powder;
    (f) about 26 wt-% powdered shortening; and
    (g) about 20 wt-% liquid egg yolk.

17. The egg product of claim 16 further comprising about 1 wt-% of a flavor enhancing agent.

18. A fried pastry product comprising a crust or dough and the egg product of claim 1.

19. The pastry product of claim 18 wherein the crust substantially completely surrounds the egg product.

20. The pastry product of claim 18 comprising a layer of crust topped with a layer of the egg product.

21. An egg product that increases in volume upon cooking by microwave energy consisting essentially of:
    (a) at least about 30 wt-% of an egg source comprising whole egg;
    (b) a humectant system comprising a low dextrose equivalent corn syrup solid in an amount effective to allow a sufficient amount of water to be bound such that the free water content of the product is less than about 30%; and
    (c) a tenderizing component, said tenderizing component selected from the group consisting of a shortening, cheese powder, and mixtures thereof, wherein said composition maintains the increased volume after cooking by microwave energy.

22. The egg product of claim 21 wherein the volume increases by about 60% upon cooking by microwave energy.

23. A method of providing a cooked egg product with increased volume, consisting essentially of adding a humectant system comprising a low dextrose equivalent corn syrup solid and a tenderizing component, said tenderizing component selected from the group consisting of a shortening, cheese powder, and mixtures thereof, to an egg source comprising whole egg to obtain an egg product comprising at least about 30 wt-% of said egg source, and wherein the humectant is added in an amount effective to allow a sufficient amount of water to be bound such that the free water content of the egg product is less than about 30% and then cooking the egg product by microwave energy, wherein said egg product maintains an increased volume after cooking by microwave energy.

24. The method of claim 23 wherein the volume of the cooked egg product increases by about 60% upon cooking by microwave energy.

* * * * *